United States Patent
Mimeault et al.

(10) Patent No.: US 8,600,656 B2
(45) Date of Patent: Dec. 3, 2013

(54) LIGHTING SYSTEM WITH DRIVER ASSISTANCE CAPABILITIES

(75) Inventors: Yvan Mimeault, Québec (CA); Daniel Cantin, Québec (CA)

(73) Assignee: Leddartech Inc., Quebec (CA)

( * ) Notice: Subject to any disclaimer, the term of this patent is extended or adjusted under 35 U.S.C. 154(b) by 425 days.

(21) Appl. No.: 12/664,753

(22) PCT Filed: Jun. 18, 2008

(86) PCT No.: PCT/CA2008/001160
§ 371 (c)(1),
(2), (4) Date: Dec. 15, 2009

(87) PCT Pub. No.: WO2008/154736
PCT Pub. Date: Dec. 24, 2008

(65) Prior Publication Data
US 2010/0191418 A1    Jul. 29, 2010

Related U.S. Application Data

(60) Provisional application No. 60/944,657, filed on Jun. 18, 2007.

(51) Int. Cl.
G06F 7/00 (2006.01)
G06F 17/10 (2006.01)
G06G 7/78 (2006.01)
G08G 1/16 (2006.01)
G01C 3/08 (2006.01)
B60Q 1/00 (2006.01)

(52) U.S. Cl.
USPC ............ 701/301; 701/36; 356/4.01; 340/435

(58) Field of Classification Search
USPC ............ 340/435; 356/3–22; 701/28, 36, 300, 701/301; 362/459, 460, 464, 465, 466
See application file for complete search history.

(56) References Cited

U.S. PATENT DOCUMENTS 3,680,085 A   7/1972   Del Signore
4,717,862 A   1/1988   Anderson
(Continued)

FOREIGN PATENT DOCUMENTS

CA   2710212    7/2009
DE   19604338   7/2004
(Continued)

OTHER PUBLICATIONS

Akindinov et al, Detection of Light Pulses Using an Avalanche-Photodiode Array with a Metal-Resistor-Semiconductor Structure, Instruments and Experimental Techniques, vol. 48, No. 3 2005, pp. 355-363.*

(Continued)

*Primary Examiner* — Khoi Tran
*Assistant Examiner* — Abby Lin
(74) *Attorney, Agent, or Firm* — Fasken Martineau

(57) ABSTRACT

A method for providing driver assistance, comprising providing a vehicle with a visible-light source, driving the source to emit visible light in a predetermined mode, receiving a reflection/backscatter of the emitted visible light from an object and generating detected light data; identifying, using the driving data and the detected light data, at least one of a presence and a position of the object as a function of the reflection/backscatter received and of the predetermined mode, detecting a visibility in the environment using the driving data and the detected light data, triggering at least one of an interaction with a driver of the vehicle and an action of the vehicle as a function of at least one of the presence of the object, the position of the object and the visibility detected by the data/signal processor.

26 Claims, 8 Drawing Sheets

(56) References Cited

U.S. PATENT DOCUMENTS

| | | | |
|---|---|---|---|
| 4,808,997 A | 2/1989 | Barkley et al. | |
| 4,891,624 A * | 1/1990 | Ishikawa et al. | 340/436 |
| 4,928,232 A | 5/1990 | Gentile | |
| 5,102,218 A | 4/1992 | Min et al. | |
| 5,134,393 A | 7/1992 | Henson | |
| 5,179,286 A | 1/1993 | Akasu | |
| 5,317,311 A | 5/1994 | Martell et al. | |
| 5,357,331 A | 10/1994 | Flockencier | |
| 5,381,155 A | 1/1995 | Gerber | |
| 5,389,921 A | 2/1995 | Whitton | |
| 5,621,518 A | 4/1997 | Beller | |
| 5,633,629 A | 5/1997 | Hochstein | |
| 5,633,801 A | 5/1997 | Bottman | |
| 5,714,754 A | 2/1998 | Nicholas | |
| 5,760,686 A | 6/1998 | Toman | |
| 5,760,887 A | 6/1998 | Fink et al. | |
| 5,764,163 A * | 6/1998 | Waldman et al. | 340/934 |
| 5,777,564 A | 7/1998 | Jones | |
| 5,805,468 A | 9/1998 | Blöhbaum | |
| 5,812,249 A * | 9/1998 | Johnson et al. | 356/28 |
| 5,828,320 A | 10/1998 | Buck | |
| 5,838,116 A | 11/1998 | Katyl et al. | |
| 5,889,477 A | 3/1999 | Fasterath | |
| 5,896,190 A * | 4/1999 | Wangler et al. | 356/4.01 |
| 5,942,753 A | 8/1999 | Dell | |
| 5,987,152 A * | 11/1999 | Weisser | 382/104 |
| 5,995,900 A | 11/1999 | Hsiao et al. | |
| 6,044,336 A | 3/2000 | Marmarelis et al. | |
| 6,094,159 A | 7/2000 | Osterfeld et al. | |
| 6,100,539 A | 8/2000 | Blümcke et al. | |
| 6,104,314 A | 8/2000 | Jiang | |
| 6,107,942 A | 8/2000 | Yoo et al. | |
| 6,115,113 A | 9/2000 | Flockencier | |
| 6,142,702 A | 11/2000 | Simmons | |
| 6,147,624 A | 11/2000 | Clapper | |
| 6,166,645 A * | 12/2000 | Blaney | 340/583 |
| 6,259,515 B1 | 7/2001 | Benz et al. | |
| 6,259,862 B1 | 7/2001 | Marino et al. | |
| 6,266,609 B1 | 7/2001 | Fastenrath | |
| 6,285,297 B1 | 9/2001 | Ball | |
| 6,340,935 B1 | 1/2002 | Hall | |
| 6,377,167 B1 * | 4/2002 | Juds et al. | 340/435 |
| 6,404,506 B1 | 6/2002 | Cheng et al. | |
| 6,411,221 B2 | 6/2002 | Horber | |
| 6,417,783 B1 | 7/2002 | Gabler et al. | |
| 6,426,708 B1 | 7/2002 | Trajkovic et al. | |
| 6,486,945 B1 * | 11/2002 | Haerle et al. | 356/218 |
| 6,502,011 B2 | 12/2002 | Haag | |
| 6,502,053 B1 | 12/2002 | Hardin et al. | |
| 6,516,286 B1 | 2/2003 | Aebischer et al. | |
| 6,548,967 B1 | 4/2003 | Dowling et al. | |
| 6,556,916 B2 | 4/2003 | Waite et al. | |
| 6,559,776 B2 | 5/2003 | Katz | |
| 6,642,854 B2 | 11/2003 | McMaster | |
| 6,650,250 B2 | 11/2003 | Muraki | |
| 6,665,621 B2 | 12/2003 | Drinkard et al. | |
| 6,753,766 B2 | 6/2004 | Patchell | |
| 6,753,950 B2 | 6/2004 | Morcom | |
| 6,765,495 B1 * | 7/2004 | Dunning et al. | 340/903 |
| 6,771,185 B1 | 8/2004 | Yoo et al. | |
| 6,794,831 B2 | 9/2004 | Leeb et al. | |
| 6,825,778 B2 | 11/2004 | Bergan et al. | |
| 6,831,576 B2 | 12/2004 | Geiger et al. | |
| 6,836,317 B1 | 12/2004 | Perger | |
| 6,842,231 B2 | 1/2005 | Nourrcier et al. | |
| 6,850,156 B2 * | 2/2005 | Bloomfield et al. | 340/467 |
| 6,885,311 B2 | 4/2005 | Howard | |
| 6,885,312 B1 | 4/2005 | Kirkpatrick | |
| 6,917,307 B2 | 7/2005 | Li | |
| 6,927,700 B1 | 8/2005 | Quinn | |
| 6,946,974 B1 | 9/2005 | Racunas, Jr. | |
| 7,026,954 B2 | 4/2006 | Slemmer et al. | |
| 7,081,832 B2 | 7/2006 | Nelson et al. | |
| 7,106,214 B2 | 9/2006 | Jesadanont et al. | |
| 7,116,246 B2 | 10/2006 | Winter et al. | |
| 7,119,674 B2 | 10/2006 | Sefton | |
| 7,119,715 B2 | 10/2006 | Orita | |
| 7,123,166 B1 | 10/2006 | Haynes et al. | |
| 7,135,991 B2 | 11/2006 | Slemmer et al. | |
| 7,148,813 B2 | 12/2006 | Bauer | |
| 7,221,271 B2 * | 5/2007 | Reime | 340/541 |
| 7,236,102 B2 | 6/2007 | Shimotani | |
| 7,250,605 B2 | 7/2007 | Zhevelev et al. | |
| 7,253,747 B2 | 8/2007 | Noguchi | |
| 7,317,384 B2 | 1/2008 | Lefranc | |
| 7,321,317 B2 | 1/2008 | Nath et al. | |
| 7,350,945 B2 * | 4/2008 | Albou et al. | 362/507 |
| 7,352,972 B2 | 4/2008 | Franklin | |
| 7,405,676 B2 | 7/2008 | Janssen | |
| 7,417,718 B2 | 8/2008 | Wada et al. | |
| 7,426,450 B2 | 9/2008 | Arnold et al. | |
| 7,486,204 B2 | 2/2009 | Quintos | |
| 7,527,207 B2 | 5/2009 | Acosta et al. | |
| 7,554,652 B1 | 6/2009 | Babin et al. | |
| 7,573,400 B2 | 8/2009 | Arnold et al. | |
| 7,635,854 B1 | 12/2009 | Babin | |
| 7,640,122 B2 | 12/2009 | Levesque et al. | |
| 7,895,007 B2 | 2/2011 | Levesque et al. | |
| 7,917,320 B2 | 3/2011 | Levesque et al. | |
| 7,957,900 B2 | 6/2011 | Chowdhary et al. | |
| 8,242,476 B2 | 8/2012 | Mimeault et al. | |
| 2003/0154017 A1 | 8/2003 | Ellis | |
| 2003/0189500 A1 | 10/2003 | Lim | |
| 2004/0035620 A1 * | 2/2004 | McKeefery | 180/168 |
| 2004/0083035 A1 | 4/2004 | Ellis | |
| 2004/0135992 A1 | 7/2004 | Munro | |
| 2005/0046597 A1 | 3/2005 | Hutchison et al. | |
| 2005/0117364 A1 * | 6/2005 | Rennick et al. | 362/540 |
| 2005/0156102 A1 * | 7/2005 | Hagleitner et al. | 250/227.25 |
| 2005/0180149 A1 * | 8/2005 | Albou et al. | 362/459 |
| 2005/0187701 A1 * | 8/2005 | Baney | 701/117 |
| 2005/0231384 A1 | 10/2005 | Shimotani | |
| 2005/0269481 A1 | 12/2005 | David et al. | |
| 2005/0270175 A1 | 12/2005 | Peddie et al. | |
| 2006/0033641 A1 | 2/2006 | Jaupitre | |
| 2006/0145824 A1 | 7/2006 | Frenzel et al. | |
| 2006/0147089 A1 * | 7/2006 | Han et al. | 382/104 |
| 2006/0149472 A1 * | 7/2006 | Han et al. | 701/214 |
| 2006/0180670 A1 | 8/2006 | Acosta et al. | |
| 2007/0018106 A1 | 1/2007 | Zhevelev et al. | |
| 2007/0061192 A1 | 3/2007 | Chew | |
| 2007/0090191 A1 | 4/2007 | Schnee et al. | |
| 2007/0091294 A1 * | 4/2007 | Hipp | 356/4.01 |
| 2007/0096943 A1 | 5/2007 | Arnold et al. | |
| 2007/0205918 A1 | 9/2007 | Riesco Prieto et al. | |
| 2007/0222639 A1 | 9/2007 | Giles et al. | |
| 2007/0228262 A1 | 10/2007 | Cantin et al. | |
| 2007/0255525 A1 | 11/2007 | Lee et al. | |
| 2008/0006762 A1 | 1/2008 | Fadell et al. | |
| 2008/0172171 A1 | 7/2008 | Kowalski | |
| 2008/0309914 A1 | 12/2008 | Cantin et al. | |
| 2009/0102699 A1 | 4/2009 | Behrens et al. | |
| 2009/0251680 A1 | 10/2009 | Farsaie | |
| 2009/0299631 A1 * | 12/2009 | Hawes et al. | 701/300 |
| 2010/0191418 A1 | 7/2010 | Mimeault et al. | |
| 2010/0194595 A1 | 8/2010 | Mimeault et al. | |
| 2010/0277713 A1 | 11/2010 | Mimeault | |
| 2010/0309024 A1 | 12/2010 | Mimeault | |
| 2011/0134249 A1 * | 6/2011 | Wood et al. | 348/164 |

FOREIGN PATENT DOCUMENTS

| | | |
|---|---|---|
| DE | 102004035856 | 3/2005 |
| DE | 102006025020 | 11/2007 |
| DE | 202008007078 | 10/2008 |
| DE | 102009013841 | 9/2009 |
| EP | 0318260 | 5/1989 |
| EP | 0476562 | 3/1992 |
| EP | 0494815 | 12/1996 |
| EP | 0838695 | 4/1998 |
| EP | 0612049 | 9/1998 |
| EP | 0988624 | 3/2000 |
| EP | 0912970 | 4/2000 |
| EP | 1034522 | 9/2000 |

(56) References Cited

FOREIGN PATENT DOCUMENTS

| | | |
|---|---|---|
| EP | 0798684 | 1/2001 |
| EP | 0779990 | 3/2003 |
| EP | 0935764 | 3/2003 |
| EP | 1296302 | 3/2003 |
| EP | 0789342 | 6/2003 |
| EP | 0784302 | 9/2003 |
| EP | 0866434 | 6/2004 |
| EP | 1521226 | 6/2006 |
| EP | 1049064 | 9/2006 |
| EP | 1048961 | 7/2009 |
| EP | 1224632 | 12/2009 |
| EP | 2136550 | 12/2009 |
| EP | 1435036 | 1/2010 |
| EP | 1611458 | 4/2010 |
| EP | 1997090 | 9/2010 |
| FR | 2690519 | 10/1993 |
| GB | 2264411 | 8/1993 |
| GB | 2354898 | 7/2003 |
| GB | 2431498 | 4/2007 |
| GB | 2445767 | 7/2008 |
| JP | 2059608 | 2/1990 |
| JP | 04145390 | 5/1992 |
| JP | 04145391 | 5/1992 |
| JP | 09178786 | 7/1997 |
| JP | 2004102889 | 4/2004 |
| JP | 2005-170184 | 6/2005 |
| JP | 2005170184 | 6/2005 |
| JP | 2006172210 | 6/2006 |
| JP | 2006521536 | 9/2006 |
| JP | 2007121116 | 5/2007 |
| WO | 8705138 | 8/1987 |
| WO | 9203808 | 3/1992 |
| WO | 9634252 | 10/1996 |
| WO | 9904378 | 1/1999 |
| WO | 0139153 | 5/2001 |
| WO | 0215334 | 2/2002 |
| WO | 03007269 | 1/2003 |
| WO | 2004100103 | 11/2004 |
| WO | 2005008271 | 1/2005 |
| WO | 2006044758 | 4/2006 |
| WO | 2006092659 | 9/2006 |
| WO | 2007071032 | 6/2007 |
| WO | 2007096814 | 8/2007 |
| WO | 2008037049 | 4/2008 |
| WO | 2008154737 | 12/2008 |
| WO | 2009013739 | 1/2009 |
| WO | 2009087536 | 7/2009 |
| WO | 2009104955 | 8/2009 |
| WO | 2009117197 | 9/2009 |
| WO | 2011077400 | 6/2011 |

OTHER PUBLICATIONS

Braun et al, Nanosecond transient electroluminescene from polymer lightemitting diodes, Applied Physics Letter 61(26), Dec. 28, 1992, pp. 3092-3094.*

United States Department of Transportation, Federal Highway Administration, Sensor Technology—Chapter 2, Traffic Detector Handbook : Third Edition—vol. 1, FHWA-HRT-06-108, available at http://www.tfhrc.gov/its/pubs/06108/02a.htm on Sep. 16, 2009.

The Vehicle Detector Cleaninghouse, A Summary of Vehicle Detection and Surveillance Technologies used in Intelligent Transportation Systems, Nov. 30, 2000, available at http://www.fhwa.dot.gov/environment/airtoxicmsat/4.htm on Sep. 16, 2009.

United States Department of Transportation, Federal Highway Administration, Department of Environment, Air Quality, Air Toxic MSAT, Monitoring Methods available at http://www.fhwa.dot.gov/ohim/tvtw/vdstits.pdf on Jul. 3, 2007.

United States Department of Transportation, Research and Innovative Technology Administration, 5.3. Infrared Detectors, available at http://ntl.bts.gov/DOCS/96100/ch05/body_ch05_03.html on Sep. 16, 2009.

Kon Tayfun, Thesis, Collision Warning and Avoidance System for Crest Vertical Curves, Virginia Tech, May 4, 1998, Appendix B2, pp. 51-92, published on Digital Library and Archives, University Libraries of Virginia Tech, available at http://scholar.lib.vt.edu/theses/available/etd-43098-201311/unrestricted/APPENDIX-B2.PDF on Sep. 16, 2009.

Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detector%20Technologies.doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT........85H on Sep. 16, 2009.

Dimitri Loukakos, Active Laser infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

Peter J. Yauch, Transportation Research Board, Traffic signal control equipment : state of the art, published in 1990 in NCHRP Synthesis of Highway Practice No. 166, 49 pages, ISBN 0-309-04917-2.

GENEQ Inc., Passive Infrared Detector for Traffic Data Acquisition, Model IR 250, Department of Meteorology, available at http://www.geneq.com/catalog/en/ir250.html on Sep. 16, 2009.

The Vehicule Detector Clearinghouse, "A Summary of Vehicle Detection and Surveillance Technologies used in Intelligent Transportation Systems", Fall 2000, Southwest Technology Development Institute (SWTDI) at New Mexico State University (NMSU), sponsored in cooperation with the U.S. Department of Transportation FHWA, available at http://www.fhwa.dot.gov/ohim/tvtw/vdstits.

U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm.

Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.

Akindinov et al., "Detection of Light Pulses Using an Avalanche-Photodiode Array with a Metal-Resistor-Semiconductor Structure", Instruments and Experimental Techniques, Nov. 2004, vol. 48, No. 3 205, pp. 355-363, Russia.

Braun et al., "Nanosecond transient electroluminescence from polymer lightemitting diodes", Applied Physics Letters Dec. 1992, vol. 61, No. 26, pp. 3092-3094, California.

* cited by examiner

LIGHTING SYSTEM WITH DRIVER ASSISTANCE CAPABILITIES

CROSS-REFERENCE TO RELATED APPLICATION

This patent application claims priority on U.S. Provisional Application No. 60/944,657, filed on Jun. 18, 2007.

FIELD OF THE APPLICATION

The present application relates to lighting systems used in the automotive industry, and more particularly to a lighting system controlled for use in providing driver assistance capabilities.

BACKGROUND OF THE APPLICATION

Each year in United States, there are numerous highway fatalities and injuries in traffic crashes. Distraction is an important factor in traffic accidents, as accidents are often caused within seconds of a lack of attention.

Several obstacle-detection systems are presently on the market for driver assistance and use different technology as radar, lidar, ultrasonic and also machine vision. However, none of these technologies is standard on a volume model as they are relatively expensive. Ultrasonic systems for parking assistance have a non-negligible penetration in the market, but the performance of this technology is not enough to be useful for other applications like adaptive cruise controlling, blind spot monitoring, pre-crash systems.

Sensoring data is a key element for driver assistance systems and its value is based on performance, integration, cost, reliability and durability.

SUMMARY OF THE DISCLOSURE

It is an object of the present application to provide a novel lighting system with capabilities to detect obstacles or presence for driver assistance systems.

It is a further object of the present application to provide a novel method for detecting obstacles or presence for driver assistance systems.

Therefore, in accordance with a first aspect, there is provided a method for providing driver assistance to a driver of a vehicle, comprising: 1) providing a vehicle with a visible-light source emitting visible light and having a function of illuminating an environment adjacent to the vehicle or emitting a signal; 2) driving the visible-light source to emit visible light in a predetermined mode, with visible light in the predetermined mode being visible to an unaided human eye to maintain said function of illuminating an environment adjacent to the vehicle or emitting a signal; 3) receiving a reflection/backscatter of the emitted visible light from an object; 4) identifying at least one of a presence and a position of the object as a function of the reflection/backscatter received and of the predetermined mode; and 5) triggering at least one of an interaction with a driver of the vehicle and an action of the vehicle as a function of the at least one of the presence and the position of the object.

Further in accordance with the first aspect, the method further comprises: retrofitting an existing vehicle light with a source controller for driving the visible-light source and a detector for receiving the reflection/backscatter of the emitted visible light from the object.

Further in accordance with the first aspect, driving the visible-light source in the predetermined mode comprises at least one of pulsating and modulating the visible light.

Further in accordance with the first aspect, receiving the reflection/backscatter comprises filtering given light wavelengths.

Further in accordance with the first aspect, identifying at least one of a presence and a position of the object comprises calculating at least a distance of the object by measuring a time delay between emitting the visible light and receiving the reflection/backscatter from the object.

Further in accordance with the first aspect, calculating the distance comprises continuously calculating the distance so as to calculate a speed of the object.

Further in accordance with the first aspect, the method further comprises: a) providing an auxiliary light source in association with the vehicle light; b) driving the auxiliary light source in another predetermined mode to emit auxiliary light; c) receiving a reflection/backscatter of the auxiliary light from an object; d) identifying at least one of the presence and the position of the object as a function of the reflection/backscatter received from the auxiliary light and the other predetermined mode; and e) triggering the interaction with the driver of the vehicle or the action of the vehicle as a function of the presence or the position of the object.

Further in accordance with the first aspect, driving the auxiliary light source comprises driving the auxiliary light source into emitting light non-visible to an unaided human eye.

Further in accordance with the first aspect, driving the visible-light source to emit visible light in a predetermined mode comprises pulsating a light emission diode to produce light pulses having a width of less than 50 ns.

Further in accordance with the first aspect, triggering an interaction with a driver of the vehicle comprises triggering an indicator on a dashboard of the vehicle.

Further in accordance with the first aspect, triggering an action of the vehicle comprises at least one of actuating a horn of the vehicle, controlling a brake of the vehicle, controlling a steering of the vehicle, adjusting a speed of the vehicle, adjusting an intensity of the visible light, emitting a warning light, and emitting a warning sound inside a cabin of the vehicle.

Further in accordance with the first aspect, driving the visible-light source to emit visible light in a predetermined mode comprises using a unique signature modulation in order to avoid interference from visible light emitted by other vehicles.

Further in accordance with the first aspect, driving the auxiliary light source to emit light in another predetermined mode comprises using a unique signature modulation in order to avoid interference from light emitted by other vehicles.

In accordance with a second aspect, there is provided a driver assistance lighting system comprising: 1) a light source emitting visible light and having a function of emitting visible light to illuminate an environment adjacent to the vehicle or emit a signal; 2) a source controller for driving the light source into emitting visible light in a predetermined mode in which the light remains visible to an unaided human eye while being driven by the source controller such that the light source maintains said function of illuminating an environment adjacent to the vehicle or emitting a signal; 3) an optical detector adapted to detect the visible light as reflected/back-scattered by an object to produce detection data; 4) a data/signal processor for receiving detection data from the optical detector, the data/signal processor producing a data output associated to at least one of a presence and a position of the object as a function of the predetermined mode and the detection data; and 5) a driver assistance processor system for triggering at least one of an interaction with a driver of the vehicle and an action of the vehicle as a function of said data output.

Further in accordance with the second aspect, the data/signal processor controls the light source into adjusting a light intensity as a function of commands from the driver assistance processor system.

Further in accordance with the second aspect, the optical detector comprises a plurality of sub-detectors each detecting a specific angular zone.

Further in accordance with the second aspect, the system further comprises a scanning mechanism in association with the optical detector so as to cause a scanning motion of a field of view of the optical detector within a range of illumination of emitted light of the light source.

Further in accordance with the second aspect, the optical detector has an array of sub-detectors.

Further in accordance with the second aspect, the source controller comprises a pulse/modulation driver to drive the visible-light source in the predetermined mode.

Further in accordance with the second aspect, the source controller comprises an illumination driver to drive the light source into emitting light of suitable intensity to illuminate the environment of the vehicle or emit a signal.

Further in accordance with the second aspect, the light source has a plurality of lights, with at least one of the lights of the light source being driven by the illumination driver to illuminate the road, while at least another one of the lights of the light source is driven by the pulse/modulation driver to emit the visible light in the predetermined mode.

Further in accordance with the second aspect, the optical detector has a filtering device to filter given light wavelengths of the reflected/backscattered visible light.

Further in accordance with the second aspect, the system further comprises an auxiliary light source for emitting an auxiliary light in another predetermined mode concurrently with the visible-light source, the reflection/backscatter of the auxiliary light received from an object being used to produce said data output associated to the object.

Further in accordance with the second aspect, the auxiliary light source comprises a non-visible light source.

Further in accordance with the second aspect, said light source comprises a light emitting diode light source.

Further in accordance with the second aspect, said driver assistance processor system triggers an interaction with the driver of the vehicle by emitting a signal on a dashboard of the vehicle.

Further in accordance with the second aspect, said driver assistance processor system triggers an action of the vehicle by at least one of actuating a horn of the vehicle, controlling a brake of the vehicle, controlling a steering of the vehicle, adjusting a speed of the vehicle, adjusting an intensity of the visible light, emitting a warning light, and emitting a warning sound inside a cabin of the vehicle.

The present application adds detection capabilities to perceive the presence and/or measure the velocity of obstacles such as automobiles, trucks, pedestrian and other users, to vehicle lighting modules as headlamp, tail lamps, centre high mount stop lamp (CHMSL) and interior lighting to name a few, for driver assistance applications like adaptive cruise control, blind spot and pre-crash assist. For example, a Light Emitting Diode (LED) has the capability to be used as lighting source for illumination as a first function and also be pulsed or modulated as a source for the detection sub-system as a second function. Other light sources, such as a laser, can be integrated into the lighting system and used as a source for the detection sub-system.

The disclosure also has the capabilities to detect particles like snow, rain, dust, smoke and fog and provide information about current weather conditions.

DESCRIPTION OF THE PREFERRED EMBODIMENTS

Figure 1:
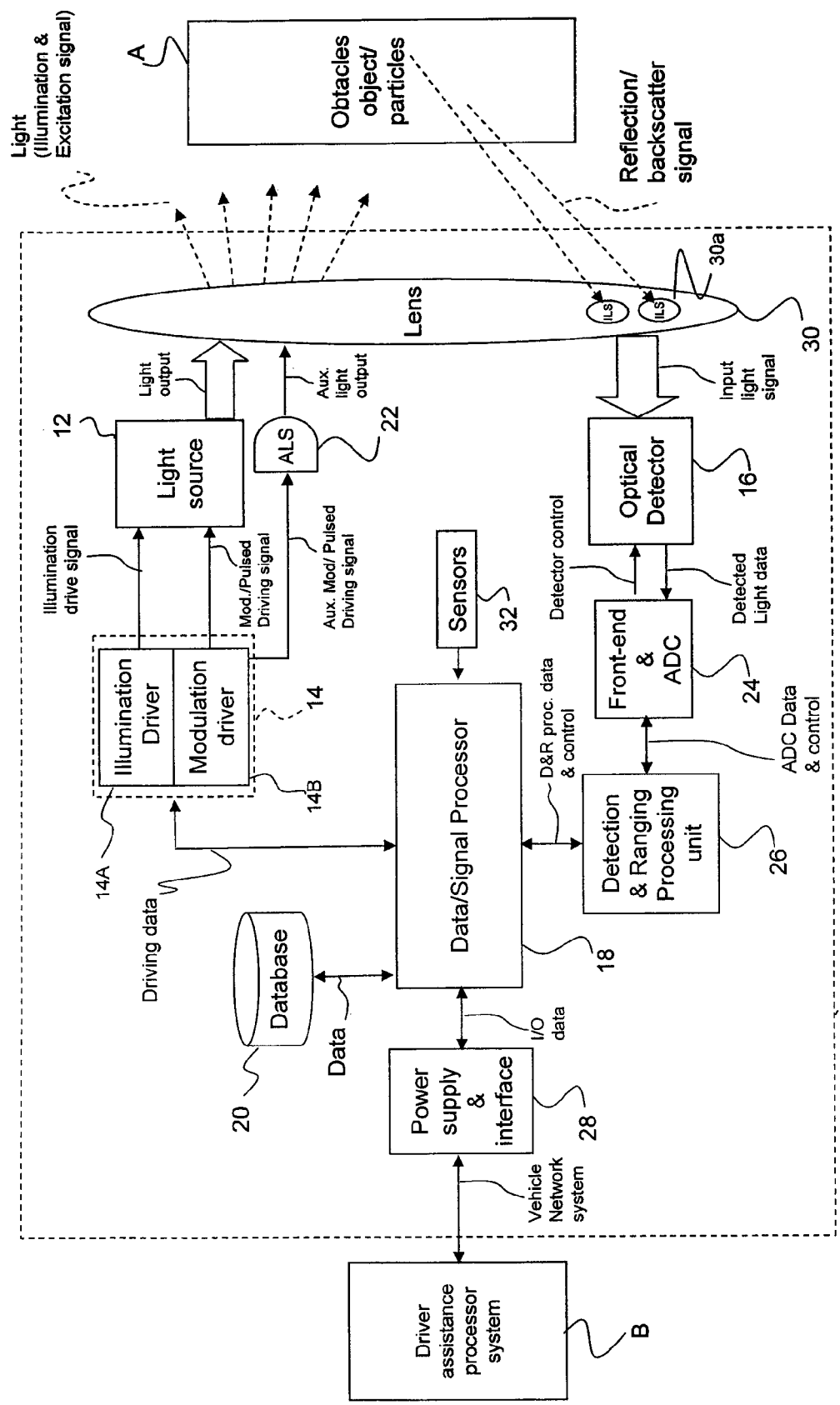
FIG. 1 is a block diagram illustrating the lighting system with capabilities to detect obstacles or presence for automotive applications.

Referring to FIG. 1, an obstacle-detecting lighting system for automotive applications in accordance with a preferred embodiment is generally shown at 10.

The system 10 has at least one visible-light source 12. The visible light source 12 is in the form of a headlamp module, a tail lamp, centre high mount stop lamp (CHMSL) and interior lighting module, to name a few. Therefore, the visible light source 12 has as a first function the emission of visible light for road illumination or visual communication of information, like signalling, for human vision (e.g., CHMSL or brake lights). This primary function of a lighting system is designed to generate light with specific criteria like optical power, field of view and light color, to meet requirements defined through a number of regulations for automotive applications.

In the preferred embodiment, the visible-light source 12 has one or more solid-state lighting devices, Light-Emitting Diodes (LEDs) or Organic LEDs (OLEDs).

The visible-light source 12 is connected to a source controller 14, so as to be driven into producing light. In addition to emitting light, the system 10 performs detection of objects and particles (e.g., vehicles, passengers, pedestrians, airborne particles, gases and liquids) when these objects are part of the environment/scene illuminated by the light source 12. Accordingly, the source controller 14 drives the visible-light source 12 in a predetermined mode, such that the emitted light takes the form of a light signal, for instance by way of amplitude-modulated or pulsed light emission.

These light signals are such that they can be used to provide the lighting illumination level required by the application, through data/signal processor 18 and source controller 14, while producing a detectable signal. Accordingly, it is possible to obtain a light level equivalent to a continuous light source by modulating the light signal fast enough (e.g., frequency more than 100 Hz) to be generally imperceptible to the unaided human eye and having an average light power equivalent to a continuous light source, suited to illuminate the road.

In an embodiment, the source controller 14 is designed to provide an illumination drive signal, such as a constant DC signal or a pulse-width modulated (PWM) signal, that is normally used in lighting systems to produce the required illumination and control its intensity. The illumination drive signal is produced by the illumination driver sub-module 14A of the controller 14.

All LEDs in a single module can be controlled by the same signal or each one or a cluster of LEDs can be controlled by several independent signals from the source controller 14. For instance, when the light source 12 is a headlamp module having an array of LED light sources, several possible headlamp design configurations are possible and have advantages in terms of adjustability and adaptability. Each LED, or cluster of LEDs, can be controlled to create a beam pattern to meet road conditions (in function of the speed, curves, right turn, and other vehicles). Several beams can be used individually to illuminate the scene with the illumination driver sub-module 14A for adaptive front lighting and these beams can be driven sequentially by a modulation driver sub-module 14B to detect objects in multiple fields of view, as will be described hereinafter. The modulation driver 14B can also be used to send data for optical communication.

A modulated/pulsed driving signal supplies the fast modulation/pulse sequence required for remote object detection. This modulated/pulsed drive signal is produced by a modulation driver sub-module 14B of the controller 14. Using LEDs, the amplitude of short-pulse (typ. <50 ns) can be several times the nominal value (typ. 10 to 100) while the duty cycle is low (typ. <0.1%).

A detector 16 is associated with the visible-light source 12 or auxiliary light source 22 and the lens 30. The detector 16 is an optical detector (or detectors) provided so as to collect light emitted by the light source 12/ALS 22 and back-scattered by the objects/particles A. The light signal can also come from an object A being the direct source of this light (such as a remote control) in order to send information to the data/signal processor 18 through the optical detector 16. The optical detector 16 is as an example any of photodiodes, avalanche photodiodes (APD), photomultipliers (PMT), CCD or cmos array sensors or 3d camera, amongst others. Other array sensors can be integrated, thermal sensor for instance. In the case of a LED light source 12, a wavelength measurement sensor can be integrated to measure the drift of the light source and estimate the temperature of the LEDs for lifetime assessment, temperature control and maintenance purposes.

Information can be provided in the form of distance measurement and other visual information to the driver assistance processor system B when an array sensor is selected. The detector 16, whether located in the external or internal lighting module, may be separate from the light source 12 and integrated with other electronics parts elsewhere on the vehicle, for instance in the interior mirror part facing outside.

Filters are typically provided with the detector 16 to control ambient light background emitted from sources other than the lighting system 10. Filters can also be used for spectroscopic measurements and to enhance performance of the light source 12. For instance, a pulsed visible-light signal from a white phosphorescent LED filtered to blue is faster as compared with an unfiltered light signal but has less power. In the case of white phosphorescent LEDs, the phosphor used converts the blue light of the LED junction into visible light with a certain time delay because of the long phosphorescence emission lifetime.

In some applications, the blue part of the emission spectrum of white phosphorescent LEDs is preferably used, with proper wavelength filtering at detection, to allow faster light modulation, since the blue part will not suffer the phosphorescent material usual modulation speed reduction. This would allow either faster modulation speeds or light pulses while keeping the broadband illumination of the white LED for the scene illumination. When the application is used to detect an object farther with less precision, the detection of the full emitted spectrum of LED is more appropriate. With the same source, a combination of blue-filter detector and full-bandwidth phosphorescent LEDs detector can optimize the precision for short distance and sensitivity for long-range detection. Usually, an application does not require the same precision for a longer range.

Both driving signals can be produced independently or in combination. Sequencing of the drive signal is controlled by a data/signal processor 18. The light source 12 can be monitored and the measurements sent to the data/signal processor 18 for the optimization of data processing. For example, a match filter can be done between the light output signal or auxiliary light output signal (described hereinafter) and input light signal from the optical detector 16.

A database 20 may be provided in association with the data/signal processor 18 so as to provide historical data, or tabulated data to accelerate the calculation of the object parameters.

An alternative for sourcing light signal for detection involves the auxiliary light source 22, a visible or non-visible source (e.g., UV or IR light, LEDs or laser) driven by the modulation driver 14B. The auxiliary light source 16 adds capabilities for detecting objects and particles. A UV light source (particularly around 250 nm) can be used to limit the impact of the sunlight when used with a UV detector. IR light can be used to increase the performance and the range of the detection area. IR lights and other types of light can be used to detect several types of particles by selecting specific wavelengths.

Figure 6A:
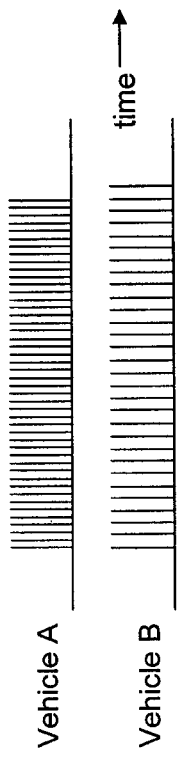
FIGS. 6A to 6C are schematic examples of signature modulation used to distinguish signals emitted by different vehicles using the object-detecting lighting system of FIG. 1.
Figure 6B:
Figure 6C:
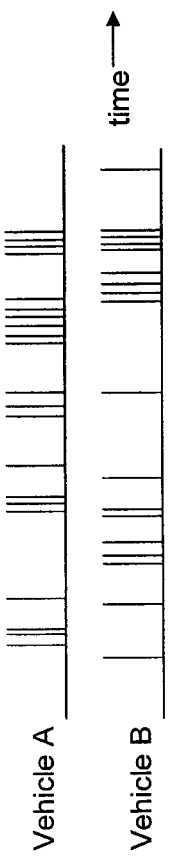

When a plurality of a lighting system 10 is used on different vehicles, a signature modulation is considered so as to avoid interference between signals of the different lighting systems 10. In FIGS. 6A to 6C, examples of signature modulation are provided, with frequency differentiation in FIG. 6A, frequency-shift keying in FIG. 6B, and pseudorandom coding in FIG. 6C. Random pulsing modulation can also be used to discriminate each system. More complex modulation can be used like chirp modulation (linear frequency modulation). The frequency of the light source 12 is modulated directly by the modulation driver 14B.

The visible-light source 12 is in one embodiment LEDs. More specifically, LEDs are well suited to be used in the lighting system 10 as LED intensity can be efficiently modulated/pulsed at suitable speed. Using this possibility, current lighting systems already installed and featuring LEDs for standard lighting applications can be used as the light source 12 for sensing applications.

The system 10 has at least one lens 30 through which light is emitted in an appropriate way for specific applications such as headlamp, tail lamps, centre high mount stop lamp (CHMSL) and interior lighting. In some cases, the headlamp for instance, each LED or cluster of LEDs can have various individual lenses to create different beam patterns for optimization depending on the required use. Reflectors can also be used to redirect the light.

In an embodiment, at least one input lens section 30A of at least one lens is used for receiving the light signal for instance reflected or diffused (i.e., backscattered) by the objects and particles A. This input lens section can be punctual or distributed (multiple zone elements) over the lens and have at least one field of view. Several types of lenses can be used, such as fresnel lenses, for instance. Fiberoptic can also be used. Module lens can also be catadioptric. Sub-section can be used for mid-infrared (3-8 um) or far infrared (typ. 8-12 um) wavelengths. A sub-section can be used for optical data reception.

A front-end and analog-to-digital converter (ADC) 24 is connected to detector 16 and receives detected light data therefrom and controls the detector. For instance, adjusting the $V_{bias}$ of an APD detector can be one of the detector controls to optimize the gain of the receiver section for an automatic gain control (AGC). Gain of amplifier can also be controlled to do the same. The front-end and ADC 24 can have several parallel channels to digitalize the information or a multiplexer when more than one optical sensing element is used.

A detection and ranging processing unit 26 is connected to the front-end 24, controls parameters such as gain of amplifier, synchronization and sample rate of the ADC, receives data from ADC and processes the data. Shift control for acquisition can improve accuracy with the same ADC sampling rate. For instance, a 20MSPS ADC can have an improved resolution if successive acquisitions are delayed y an equivalent fraction of the acquisition time period. A better resolution increases the precision when measuring the rise time or the peak position of the signal.

Interpolation and differential calculus can be processed by the detection and ranging processing unit 26 to increase the precision. Averaging is another pre-process treatment to improve signal/noise ratio. Other techniques like a moving-average filter improve the performance. Match filter (input/output signals) improve the resolution. An object can also be locked and followed with FFT processing. A specific processing function can be used for each point of the LIDAR trace.

For instance, more samples can be averaged for a point which represents farther distance (trade-off between signal-to-noise ratio and number of results per second). More shift control (delay) can be used for acquisition in the short range (more resolution to measure the distance) and more samples typically result in a better signal-to-noise ratio for acquisition in the long range. Specific processing can be used for overlapping regions at a certain distance covered by more than one detector. The detection and ranging processing unit 26 can also be used for pre-process speed computation. Some environmental/weather conditions like fog, snow, rain, or dust, to name a few, can be estimated, whereby slid objects and slippery surfaces can be detected. The cleanliness of the lighting module and the required maintenance can also be detected The data/signal processor 18 is connected to the detection and ranging processing unit 26, and receives pre-processed data. The data/signal processor 18 is also connected to the source controller 14, so as to receive driving data therefrom. The data/signal processor 18 has a processing unit (e.g., CPU) so as to interpret the pre-processed data from the detection and ranging processing unit 26, in comparison with the driving data of the source controller 14, which provides information about the predetermined mode of emission of the light signals emitted by the visible-light source 12.

Accordingly, information about the object (e.g., presence, distance, speed of displacement, dimension, visibility) is calculated by the data/signal processor 18 as a function of the relation (e.g., phase difference, relative intensity, spectral content, time of flight, etc.) between the driving data and the detected light data, as optionally pre-processed by the front-end and ADC 24 and the detection and ranging processing unit 26. The speed of the object can also be measured with the modulation phase shift measurement (or time of flight of pulsed light) technique described previously. The measurement of vehicle speed is also possible either by distance measurement.

The system 10 has a power supply and interface 28. The interface 28 is connected to the data/signal processor 18 and is in communication with the driver assistance processor system B.

The system 10 has sensors 32 connected to data/signal processor 18. Sensors 32 are composed with an inclinometer, accelerometer, speedometer, temperature sensor, day/night sensor to name a few type of sensors. Those sensors 32 are useful during the installation and during operation. For instance, data from inclinometer, speedometer, and accelerometer are useful to compensate for the impact on the field of view by the effect of vibration and speed. Temperature sensors are useful to provide information about weather (internal, external or remote temperature with FIR lens). Thermal sensor can be useful to determine the temperature of objects and classify these objects (human, animals, vehicles, trees, etc.).

In view of the calculation it performs, the data/signal processor 18 controls the source controller 14 and thus the light output of the visible-light source 12. For instance, the visible-light source 12 may be required to increase or reduce its intensity, or change the parameters of its output.

In an embodiment, the data/signal processor 18 may send the calculation output to a driver assistance processor system B in such a way that the system B acts upon the information provided by the data/signal processor 18. The system B can also give input parameters/commands to be used to the data/signal processor 18. These parameters can be adjustments to be performed to current calibration, new programs to be implemented for the current application, or data to be added to the database 20. The system B can also send the information about the speed of the vehicle, the steering position, yaw-rate. This information can be used by the data/signal processor 18 to complete its operation. The driver assistance processor system B can be the central body controller of the vehicle. Accordingly, the system B may selectively control the vehicle, for instance by controlling the information provided on the dashboard using dashboard indicators and signaling problems to the driver. Moreover, the system B is typically connected to the cruise control of the vehicle, and may adjust the speed of the vehicle. Also, the system B may actuate the horn of the vehicle or activate pre-crash protection measures, such as enabling the air bags, locking the seat belts, providing brake assistance. The system B controls the lighting module and uses the information from the system 10 to apply it for its own driver assistance process application. The system B can also use other information from other sensors.

The configuration of the detector 16 and of the data/signal processor 18 is dependent on the application's requirements. One difficulty in many applications is to obtain an appropriate distance measurement when multiple objects are located at different positions within the fields of view of both the light source 12 and the optical detector 16. In such a case, each object in the field of view will contribute to the final distance value, weighed according to its real distance and reflectivity. One of the ways to get around this issue is to restrict the field of view of the detector(s), which limits the volume of space being probed. Sensor configurations are arranged according to the specifications required from the application.

Figure 2A:
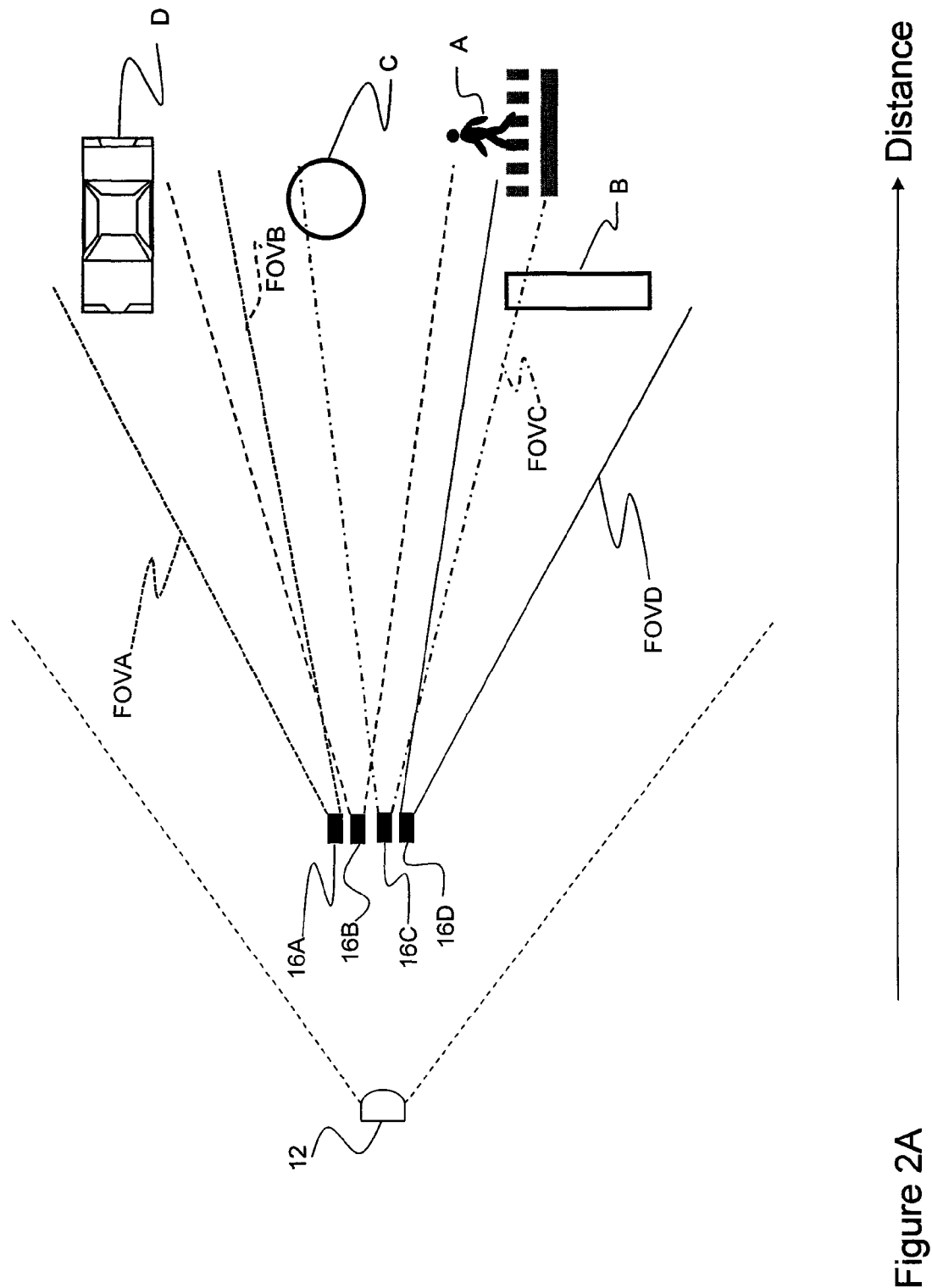
FIG. 2A is a schematic view of an example sensor configuration for the object-detecting lighting system of FIG. 1, with multiple detectors.
Figure 2B:
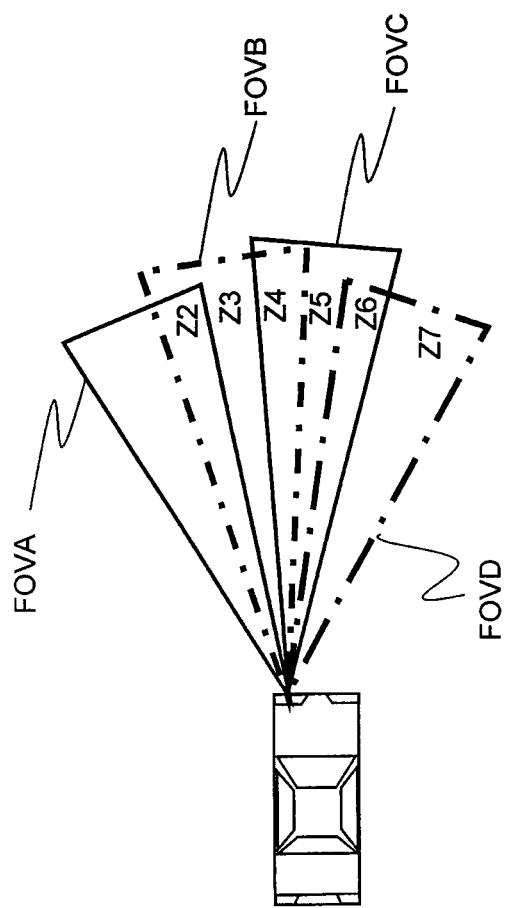
FIG. 2B is a schematic view of the sensor configuration of FIG. 2A, as used by a vehicle.

One example embodiment using this principle is shown in FIGS. 2A and 2B. A sensor configuration involves a plurality of discrete detectors, each observing a respective fixed field of view (FOVA through FOVD) within a volume of space illuminated by the light source 12 and comprising several objects (A to D). Fields of view of the detectors are narrow or might be a combination of narrow and wide field of views as a trade-off between distance accuracy and number of necessary detectors. The optical detectors 16A to 16D are an example any of photodiodes, APD, PMT or CCD or cmos array.

Referring to FIG. 2B, the overlap between fields of view FOVA to FOVD creates a plurality of angular zones, namely zones Z1 to Z7. According to an identification of the zones in which an object is, the angular position of the object is readily detected.

Figure 2C:
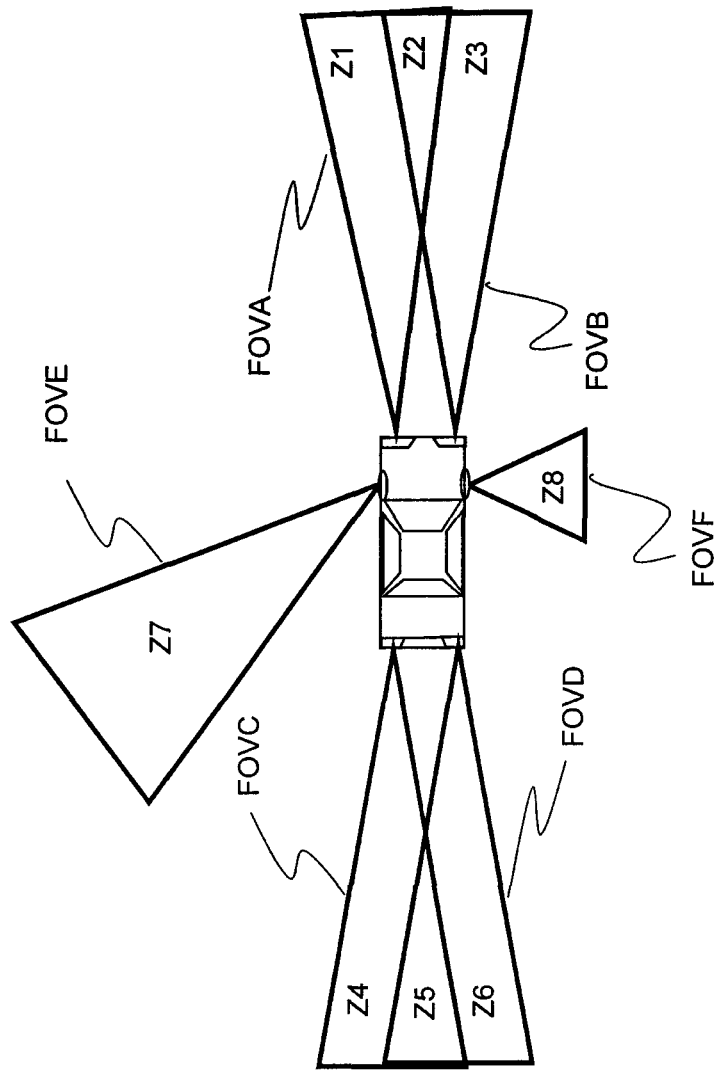
FIG. 2C is a schematic view of a vehicle with the sensor configuration of FIG. 2A, and other lighting systems as in FIG. 1.

FIG. 2C illustrates a vehicle having a plurality of zones as different lights of the vehicle are configured to be used as the lighting system 10. Accordingly, the vehicle has zones resulting from overlapping fields of view, as well as zones from other lights of the vehicle.

Figure 3:
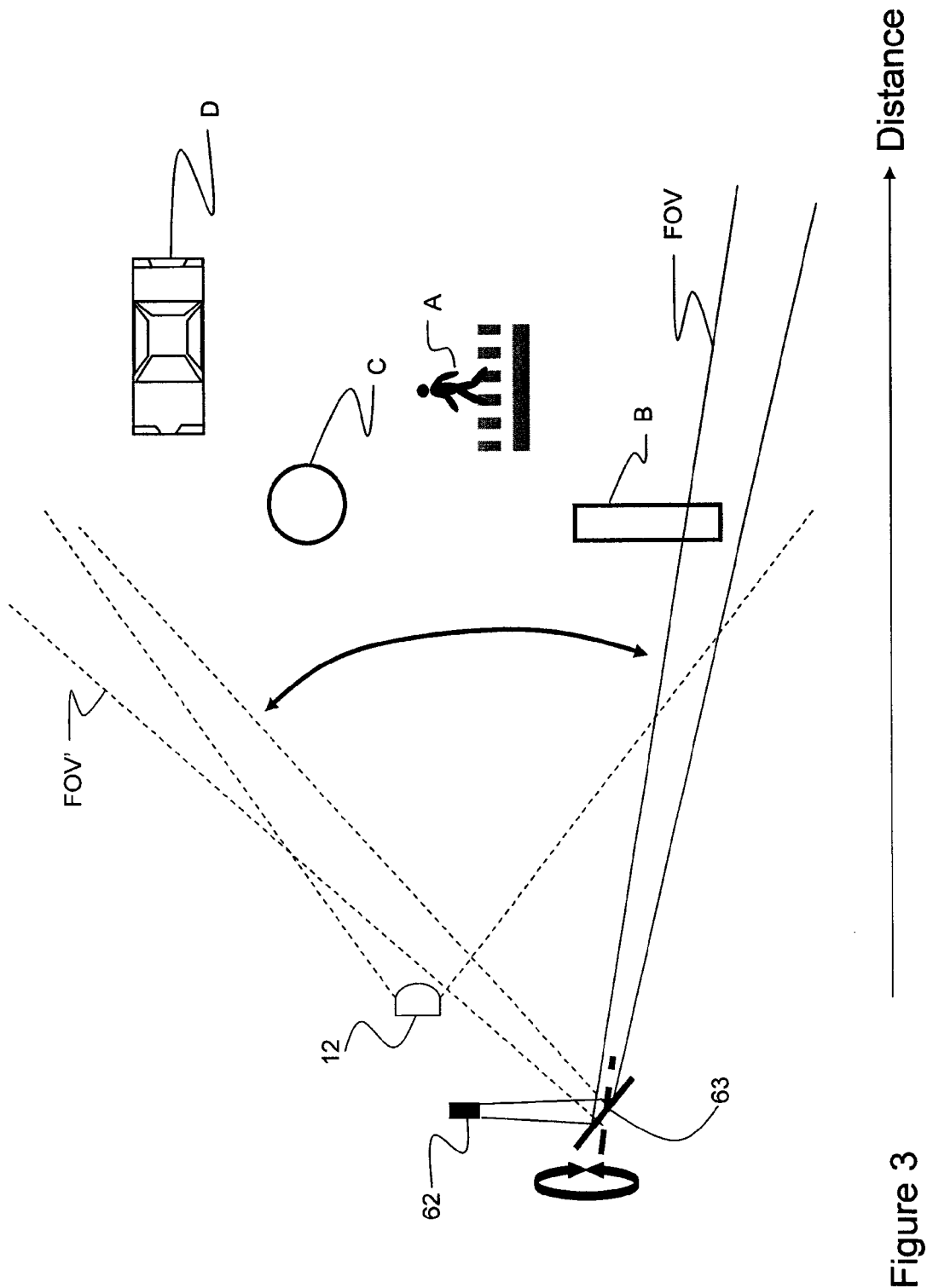
FIG. 3 is a schematic view of another sensor configuration for the object-detecting lighting system of FIG. 1, with a scanning mechanism.

In another embodiment, a sensor configuration is depicted in FIG. 3. In this case, the light source illuminates the same scene enclosing objects A through D, but typically one discrete detector 62 having a narrow field of view FOV is used in combination with a scanning mechanism 63. The scanning mechanism 63 changes the portion of the illuminated volume being probed by the detector, in essence changing the field of view FOV to FOV'. Again, detector 62 might be any of a photodiode, an APD, a PMT or equivalent thereof. This configuration minimizes the number of components but requires sequential probing of the illuminated volume and the use of a mobile part in the scanning mechanism 63. Moreover, a motion of the scanning mechanism 63 must be actuated and monitored by the data/signal processor 18 as the orientation of the scanning mechanism 63 will have an effect on the calculation of the position of the objects.

Figure 4:
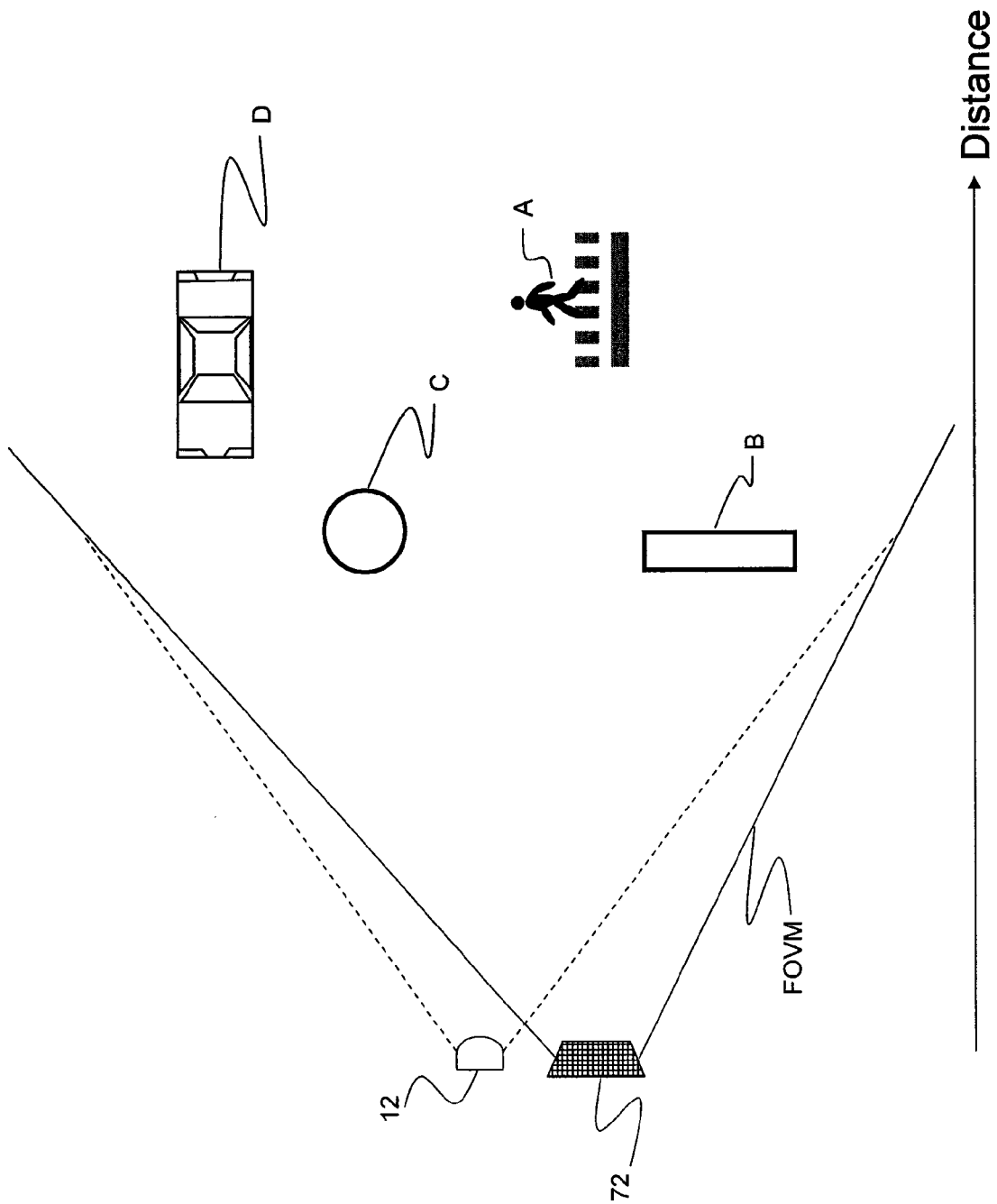
FIG. 4 is a schematic view of another sensor configuration for the object-detecting lighting system of FIG. 1, using a detector array.

In another embodiment, illustrated in FIG. 4, a detection array 72 is used with a large field of view FOVM encompassing the whole illuminated scene as illuminated by light source 12. Each pixel of the array 72 acts as a discrete detector with a very narrow field of view and probes a specific portion of the illuminated scene, as determined by any secondary optics in front of the array. The array 72 is any linear or 2D-type array, such as APD or photodiode arrays, CCD and CMOS sensors. CMOS sensors with fast electronic shutter are particularly efficient.

Figure 5:
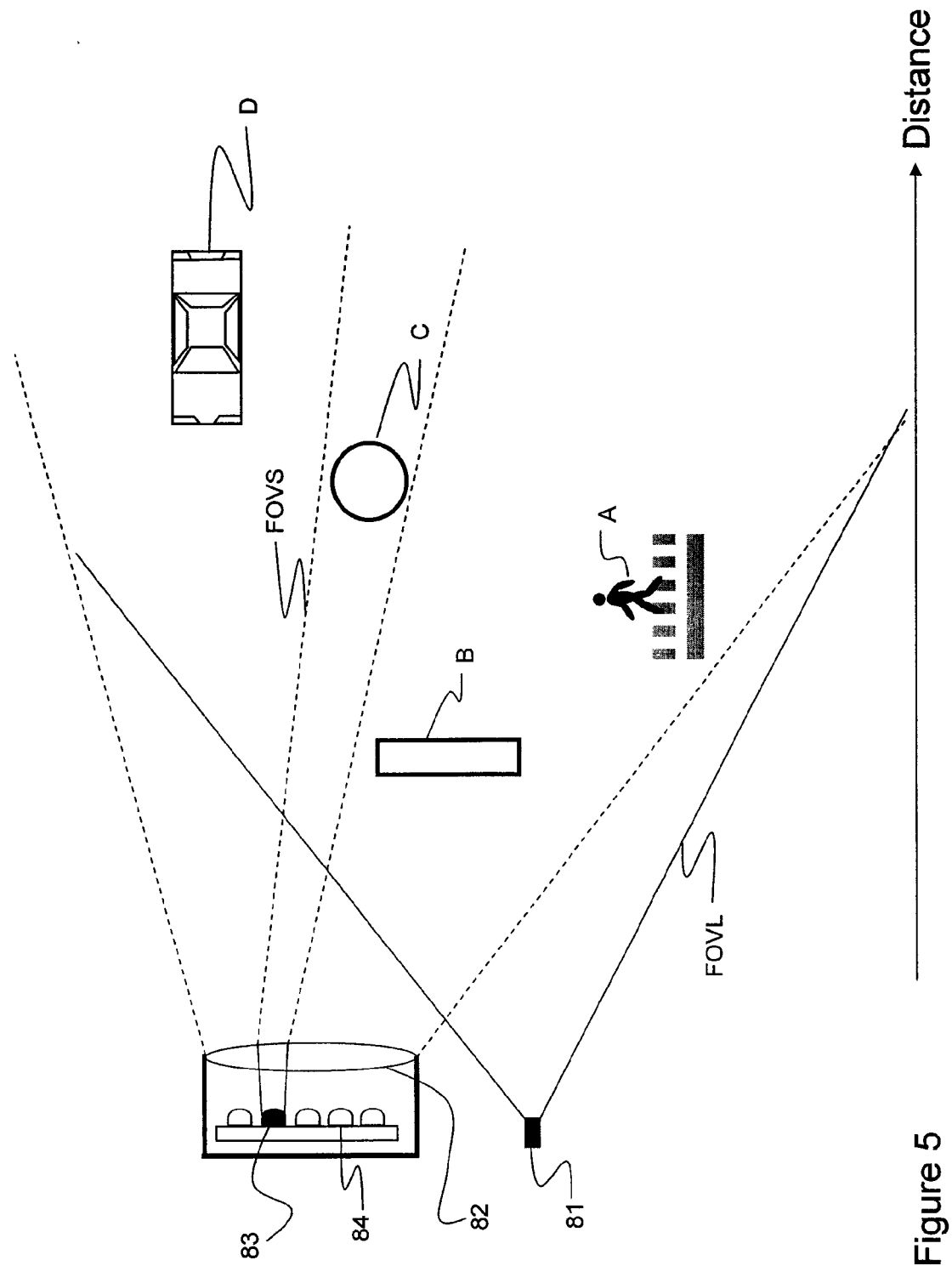
FIG. 5 is a schematic view of another sensor configuration for the object-detecting lighting system of FIG. 1, using a light source array.

Another embodiment presented in FIG. 5 transfers to the source side the need to select a field of detection from within the field of illumination. In this embodiment, the light source is composed of multiple individual lighting elements (e.g., LEDs or small clusters of LEDs) that are driven together by the illumination drive signal (without modulation), providing constant illumination of the scene. A lens 82 is used to alter the emitted light, and sensor 81 detects the input light signal.

Using a sequencing component within the source controller, each lighting element 83,84 can be switched in turn from the illumination signal only to the modulated signal (or a combination of both illumination and modulation drive signals) required by the predetermined driving mode for a specific duration in a cycle. The modulated light element 83 illuminates only a portion of the scene with a narrow field of view FOVS, as determined by the appropriately designed secondary optics, while the other elements (e.g., 84) are fed by the illumination drive signal only, illuminating the rest of the scene without modulation.

After the specified duration, another element (e.g., 84) is switched to modulated mode and the initial element 83 falls back to the illumination drive signal only. This operation is repeated according to programming of the data/signal processor 18, which controls drive sequencing (as shown in FIG. 1). In essence, the modulated or pulsed light emission is being scanned in discrete steps in the illuminated spatial volume.

In such a configuration, discrete detector 81 with a large field of view FOVL encompassing the entire illuminated scene will be sensitive only to objects within FOVS. The discrete detector 81 may be any of a photodiode, an APD, a PMT or equivalent thereof. This configuration is well adapted for applications where the light source is or can be a group of lighting elements and simplifies the detection stage design, at the price of possible lower brightness of the modulated or pulsed source, more sophisticated design of the secondary source optics and sequential probing of the spatial volume of interest.

The system 10 can provide information about temperature, visibility (fog, snow, rain), condition of the road (icy) and pollution (smog). The system 10 can be useful to adjust the intensity of light depending on weather conditions. It can also detect light from other vehicles and send to the system B useful information. For instance, system 10 can detect a brake light from a vehicle ahead which is stopping (warn the driver assistance processor system) or forward lamp for a vehicle which is coming (adjust the headlight).

The system 10 has a power supply and interface 28. The interface section is connected to data/signal processor 18 and communicates to the driver assistance processor system by in-vehicle networking such as Controller Area Network (CAN), Local Interconnect Network (LIN), FlexRay, Media-oriented Systems Transport (MOST) to name a few.

Exterior lamps are attached at the front, the side or the rear of the vehicle. They help the driver to see in the dark and to inform other users by means of the signals (position light, side marker light, tail light, fog light, brake light, center high mounted stop light, front/side/rear indicator light, reversing light). The automotive industry is looking for automated means to detect and measure the distance to cars and pedestrians around automobiles in order to automatically control the speed and brakes of the vehicles in collision avoidance systems and for adaptive cruise controls and for driver assistance system. Collisions are responsible for multiple deaths and injuries every year. Future trends in automotive safety/collision warning systems are to create a full-perimeter vehicle coverage (360° "bubble") and sensing systems are the key element.

The automotive industry is moving toward new technologies (e.g., collision avoidance systems, pedestrian safety systems, blind spot detection, occupant position detectors, etc.) in order to decrease the number of fatalities related to collisions. One way of performing this is to automatically detect obstacles along and beside the road with the lighting system 10, to make the car or the driver react accordingly.

For example, it is contemplated to link cruise control systems (and other safety systems) as the external system B associated with the lighting system 10. Such adaptive cruise control can be used to allow a car to automatically adapt its speed to a preceding car.

In another embodiment, the lighting system 10 may be used to trigger actions from the vehicle. For instance, it is known the animals are often blinded by car lights, and tend to stay on the road. Accordingly, the lighting system 10 is used to detect the presence of objects coming closer to the vehicle. When reaching a pre-established close range, the driver assistance processor system B may automatically actuate the horn of the vehicle, so as to scare the animal off the road. In an embodiment, the driver may put the processor system B in a warning mode when entering animal-collision warning zones. Accordingly, the application of the processor system B involves the actuation of the horn when detecting objects in the path of the vehicle, as detected using the lighting system 10.

Other triggered actions may include the automatic deceleration of the vehicle, the alarm signals on the dashboard, the adjustment of the light intensity (e.g., going on high beam lighting, turning on the hazard lights, etc.

LIDAR systems have been described in the prior art as being used in cars. In such applications, a laser is generally required for sufficient suppression of background sunlight or other cars' headlights. Furthermore, in order to cover a large field of view allowing the driving lane and also the lanes on each side to be seen, the laser has to scan all around the car, or many lasers have to be used making this an expensive and complicated lighting device.

On the other hand, the lighting system 10 may use the headlights or signal lights based on LEDs (or other similar solid-state lighting devices) already present in cars as light source 12, whereby a large field of view would be covered without moving mechanical parts. The LEDs of the headlights can be modulated or pulsed in order to get the capability to discriminate more easily against the background lights. As the background lights of other vehicles may be equipped with the lighting system 10 as well, the modulation frequencies used could then be swept (or shifted in time such as in optical-frequency-domain reflectometry) in order to allow discrimination of a large amount of cars lighting devices without possible interference. Alternatively, the method of signature modulation described above could also be used.

Furthermore, the amplitude modulation or pulses can be used through known phase shift or time of flight measurements to get the distance between the car and other cars or objects (such as pedestrians) in the field of illumination of the headlights. This, coupled with adaptive cruise control, can be used to control the car's speed or brakes to avoid possible collisions at a lower cost and possibly with better efficiency and larger diffusion in all car market categories from low-to high-budget cars. In fact, all the already installed lighting systems around and in the car (such as brake lights, turn lights, or car ceiling lights) could be used in a similar manner to collect information on the presence and distance of objects or individuals, by designing/retrofitting them into the lighting system 10, provided the light source 12 is suitable. The visibility in bad weather could also be estimated through light-diffusion measurements on snow, fog, dust or rain. Other applications considered include parking assistance, blind-spot detector.

Reading/map lights in lighting interior mirror or other interior lighting module can be used to detect and measure the occupant's position in the vehicle.

In the case of prior art obstacle detection systems, it is difficult or at least there are some inconveniences to placing and integrating sensors in a vehicle (place needed, position, cable, etc.) Lighting system 10 optimizes the integration because lighting modules are already well positioned and powered and allow cheaper detection. Maintenance and repairs would also be less costly. Furthermore, using multiple detectors having different fields of view would allow detection of many vehicles at the same time and/or their speed, making it a useful tool for several applications (Park assist, pedestrian detection, pre-crash, blind spot, adaptive cruise control with stop and go, occupant position, automatic emergency braking, collision avoidance, rain sensor/fog sensor/visibility sensor).

It is pointed out that a plurality of the lighting system 10 may be used with a single driver assistance processor system B. Moreover, a plurality of lights sources 12 and detectors 16 may be used with a same data/signal processor 18.

The invention claimed is:

1. A method for providing driver assistance to a driver of a vehicle, comprising:
providing a vehicle with a visible-light source emitting visible light and having a function of illuminating an environment adjacent to the vehicle or emitting a signal, said visible-light source being a light emission diode;
driving the visible-light source using a visible-light source controller to emit visible light in a predetermined mode using driving data, with visible light in the predetermined mode being visible to an unaided human eye to maintain said function of illuminating an environment adjacent to the vehicle or emitting a signal, said driving the visible-light source including pulsating the visible light to generate a pulsed visible light signal having an emitted visible-light pulse;
providing said driving data to a data/signal processor;
receiving a reflection/backscatter of the emitted pulsed visible light signal from an object, at a visible light optical detector, and generating detected light data having a detected visible-light pulse using said visible light optical detector, said reflection/backscatter being sampled at an acquisition rate to generate said detected light data;
identifying, by said data/signal processor, at least one of a presence and a position of the object using said driving data and said detected light data as a function of the reflection/backscatter received and of the predetermined mode;
detecting, by said data/signal processor, a visibility in said environment using said driving data and said detected light data, said visibility being a presence of at least one of fog, snow, dust, smoke, rain, ice, gas, liquid, airborne particle and smog in said environment;
wherein said identifying and said detecting by said data/signal processor use a relation between said emitted visible-light pulse driven by said driving data and said detected visible-light pulse sampled in said detected light data; and
triggering, using a driver assistance processor system, at least one of an interaction with a driver of the vehicle and an action of the vehicle as a function of at least one of the presence of the object, the position of the object and the visibility detected by said data/signal processor.

2. The method according to claim 1, further comprising retrofitting an existing vehicle light with said visible-light source controller for driving the visible-light source and said visible light optical detector for receiving the reflection/backscatter of the emitted visible light from the object.

3. The method according to claim 1, wherein receiving the reflection/backscatter comprises filtering given light wavelengths using a filtering device.

4. The method according to claim 1, wherein said identifying, using said data/signal processor, at least one of a presence and a position of the object comprises calculating at least a distance of the object by measuring a time delay between emitting the visible light from the visible-light source and receiving the reflection/backscatter from the object at said visible light optical detector.

5. The method according to claim 4, wherein calculating the distance comprises continuously calculating the distance so as to calculate a speed of the object.

6. The method according to claim 1, further comprising:
providing an auxiliary light source in association with the vehicle visible-light source;
driving the auxiliary light source in another predetermined mode to emit auxiliary light using an auxiliary light source controller;
receiving a reflection/backscatter of the auxiliary light from an object using an auxiliary optical detector;
identifying, using said data/signal processor, at least one of the presence and the position of the object as a function of the reflection/backscatter received from the auxiliary light at said auxiliary optical detector and the other predetermined mode of said auxiliary light driven using said auxiliary light source controller; and
triggering, using said driver assistance processor system, at least one of an interaction with the driver of the vehicle and an action of the vehicle as a function of the presence or the position of the object identified by said data/signal processor.

7. The method according to claim 6, wherein driving the auxiliary light source comprises driving the auxiliary light source into emitting light non-visible to an unaided human eye.

8. The method according to claim 1, wherein driving the visible-light source to emit visible light in a predetermined mode comprises pulsating said light emission diode to produce light pulses having a width of less than 50 ns using said visible-light source controller.

9. The method according to claim 1, wherein triggering at least one of an interaction with the driver of the vehicle and an action of the vehicle comprises triggering an indicator on a dashboard of the vehicle.

10. The method according claim 1, wherein triggering an action of the vehicle comprises at least one of actuating a horn of the vehicle, adjusting a speed of the vehicle, controlling a brake of the vehicle, controlling a steering of the vehicle, adjusting an intensity of the visible light, emitting a warning light, and emitting a warning sound inside a cabin of the vehicle.

11. The method according to claim 1, further comprising driving the visible-light source to use a unique signature modulation in order to avoid interference from visible light emitted by other vehicles.

12. The method according to claim 6, wherein driving the auxiliary light source by said auxiliary light source controller to emit light in another predetermined mode comprises using a unique signature modulation in order to avoid interference from light emitted by other vehicles.

13. A driver assistance lighting system comprising:
a light source emitting visible light and having a function of emitting visible light to illuminate an environment adjacent to the vehicle or emit a signal, wherein said visible-light source is a light emission diode;
a source controller for driving the light source, using driving data, into emitting visible light in a predetermined mode in which the light remains visible to an unaided human eye while being driven by the source controller such that the light source maintains said function of illuminating an environment adjacent to the vehicle or emitting a signal, said source controller comprising a pulse/modulation driver to drive the visible-light source in the predetermined mode and generate a pulsed visible light signal having an emitted visible-light pulse;
an optical detector adapted to detect the visible light as reflected/backscattered by an object to produce detection data having a detected visible-light pulse, said optical detector including an analog-to-digital converter, said reflected/backscattered visible light being sampled at an acquisition rate by said analog-to-digital converter;
a data/signal processor for receiving said detection data from the optical detector and said driving data, the data/signal processor producing a data output associated to at least one of a presence and a position of the object as a function of the predetermined mode and the reflected/backscattered light detected, using a relation between said emitted visible-light pulse driven by said driving data and said detected visible-light pulse sampled in the detection data, said data/signal processor further detecting a visibility in said environment using said predetermined mode and said detection data, said visibility being provided with said data output, said visibility being a presence of at least one of fog, snow, dust, smoke, rain, ice, gas, liquid, airborne particle and smog in said environment; and
a driver assistance processor system for triggering at least one of an interaction with a driver of the vehicle and an action of the vehicle as a function of at least one of said presence of said object, said position of said object and said visibility detected by said data/signal processor.

14. The driver-assistance lighting system according to claim 13, wherein the data/signal processor controls the light source into adjusting a light intensity as a function of commands from the driver assistance processor system.

15. The driver-assistance lighting system according to claim 13, wherein the optical detector comprises a plurality of sub-detectors each detecting a specific angular zone.

16. The driver-assistance lighting system according to claim 13, further comprising a scanning mechanism in association with the optical detector so as to cause a scanning motion of a field of view of the optical detector within a range of illumination of emitted light of the light source.

17. The driver-assistance lighting system according to claim 13, wherein the optical detector has an array of sub-detectors.

18. The driver-assistance lighting system according to claim 13, wherein the source controller comprises an illumination driver to drive the light source into emitting light of suitable intensity to illuminate the environment of the vehicle or emit a signal.

19. The driver-assistance lighting system according to claim 18, wherein the light source has a plurality of lights, with at least one of the lights of the light source being driven by the illumination driver to illuminate the road, while at least another one of the lights of the light source is driven by the pulse/modulation driver to emit the visible light in the predetermined mode.

20. The driver-assistance lighting system according to claim 13, wherein the optical detector has a filtering device to filter given light wavelengths of the reflected/backscattered visible light.

21. The driver-assistance lighting system according to claim 13, further comprising an auxiliary light source for emitting an auxiliary light in another predetermined mode concurrently with the visible-light source, the reflection/backscatter of the auxiliary light received from an object being used to produce said data output associated to the object.

22. The driver-assistance lighting system according to claim 21, wherein the auxiliary light source comprises a non-visible light source.

23. The driver-assistance lighting system according to claim 13, wherein said driver assistance processor system triggers an interaction with the driver of the vehicle by emitting a signal on a dashboard of the vehicle.

24. The driver-assistance lighting system according to claim 13, wherein said driver assistance processor system triggers an action of the vehicle by at least one of actuating a horn of the vehicle, adjusting a speed of the vehicle, controlling a brake of the vehicle, controlling a steering of the vehicle, adjusting an intensity of the visible light, emitting a warning light, and emitting a warning sound inside a cabin of the vehicle.

25. The method according to claim 1, wherein said driving the visible-light source includes modulating said pulsed visible light signal to generate a modulated pulsed visible light signal.

26. The driver-assistance lighting system according to claim 13, wherein said pulse/modulation driver drives the visible-light source to generate a modulated pulsed visible light signal.

\* \* \* \* \*